Sept. 16, 1930.  H. PILOTY  1,776,132
PROTECTIVE ARRANGEMENT
Filed Sept. 30, 1929
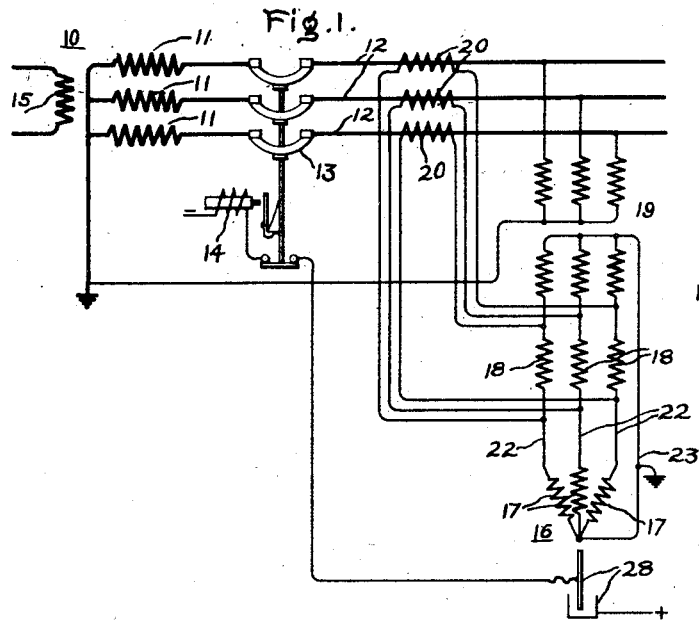
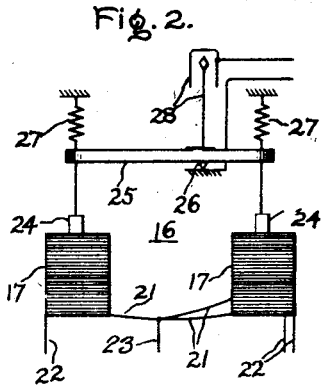
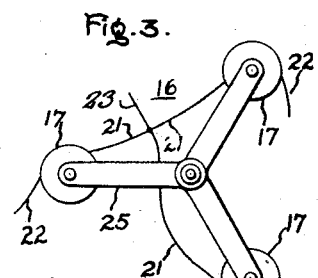
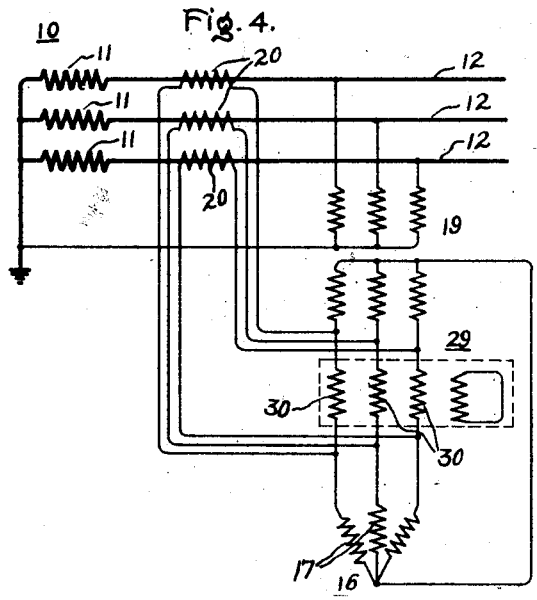
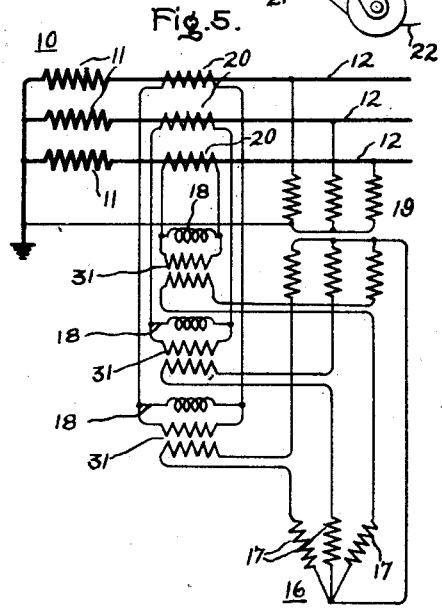
Inventor
Hans Piloty,
by Charles E. Tullar
His Attorney.

Patented Sept. 16, 1930

1,776,132

UNITED STATES PATENT OFFICE

HANS PILOTY, OF WILMERSDORF, GERMANY, ASSIGNOR TO GENERAL ELECTRIC COMPANY, A CORPORATION OF NEW YORK

PROTECTIVE ARRANGEMENT

Application filed September 30, 1929, Serial No. 396,316, and in Germany December 27, 1928.

My invention relates to improvements in protective arrangements for electric machines and apparatus and particularly alternating current machines in case of contact of the windings or short-circuits between turns. By this is meant, for example as a result of defective insulation, the occurrence of an electric connection of two points, normally at different potentials, of the windings. With such a fault, in consequence of the potential difference and the small resistance of the short-circuited turns there tends to flow therein a large current which quickly produces a disturbance in the machine. It is, therefore, desirable to provide the machines with devices which respond in the case of winding faults and which initiate whatever measures are necessary for avoiding further damage and particularly for opening the circuit of the winding, stopping the machine, weakening the exciting field, actuating the fire extinguishing device, etc.

Protective devices which operate in response to winding short-circuits are known. Some of these operate for example on the basis that currents in the winding parts in the absence of trouble in the machine are equal and in the same phase are mutually balanced. The design of such devices, however, calls for a special construction of the machine to be protected, for example, the subdividing of the windings in parallel branches or arranging taps. In the case of the known protective devices, a relay is influenced by the potential difference occurring in case of a winding contact between an artificial neutral point and the neutral point of the machine to be protected. These devices are subject to the influence of triple frequency harmonic currents which flow between the neutral points even in normal operation and may cause unnecessary circuit interruption.

An object of my invention is to provide a particularly simple protective arrangement which is in general an improvement over devices for this pupose heretofore known to the art and which does not require any special arrangement or construction of the machine to be protected. My invention is in part based on the novel principle of the equalization of the absolute amounts of the electromotive forces which are produced in the individual phases of the machine to be protected and includes the feature that there are supplied to an electroresponsive device, such as a relay, voltages which are proportional to the generated or nominal electromotive forces of the individual phases of the machine to be protected. The relay may be such that in case of inequality of the absolute amounts of these electromotive forces, it responds and thereby sets in operation the necessary auxiliary devices.

My invention will be better understood from the following description when considered in connection with the accompanying drawing and its scope will be pointed out in the appended claims.

In the accompanying drawing, Fig. 1 illustrates diagrammatically a protective arrangement embodying my invention; Figs. 2 and 3 illustrate schematically in plan and elevation a form of relay which may be used in carrying out my invention, and Figs. 4 and 5 illustrate diagrammatically modifications of my invention.

In the protective arrangement shown in Fig. 1, a dynamo electric machine such as a three phase generator 10 has its armature windings 11 arranged to be connected to a circuit such as a bus 12 through suitable circuit controlling means such as a latched closed circuit breaker 13 having a trip coil 14. The generator 10 is shown as having a field or exciting winding 15.

For controlling the circuit interrupter 13 in response to abnormal conditions of the winding 11, a relay 16 is shown as having a plurality of windings 17 connected through series impedances 18 to the secondary windings of a potential transformer 19 whose primary winding is connected to the bus 12. The potential transformer 19 may be of the polyphase type with a free magnetic return circuit or may include three single phase transformers. The neutral point of the primary windings of the potential transformer 19 is connected with the neutral point of the generator windings 11 so that between the secondary terminals of the potential transformer and its secondary neutral point voltages occur which are proportional to the phase or terminal voltages of the generator. In order to take care of turn short-circuits due to grounds on the armature windings, the primaries of the potential transformer 19 may be grounded as shown.

The purpose of the series impedances 18 is to reproduce the voltage drop between the terminal voltages and the nominal electromotive forces of each generator phase. They are accordingly connected to the current transformers 20 in the circuit coming from the generator 10. Consequently, the impedances 18 are traversed by currents which are proportional to the load currents so that with the proper adjustment of the impedances, voltages are produced which correspond to the voltage drops in the windings 11 of the generator. There are, therefore, supplied to the respective windings 17 of the relay 16, resultant voltages made up of two components of which one corresponds to the terminal voltage of the phase winding and the other to the internal voltage drop of the winding. The resultant or vector sum of these voltages is thus proportional to the electromotive forces of the individual phase windings 11 of the generator protected. In other words, the relay windings 17 are connected to be energized in accordance with the relation between the nominal and terminal voltages of the machine.

Figs. 2 and 3 illustrate more in detail one form of balanced relay 16 which may be used with the illustrated embodiments of my invention. As shown, the three relay coils 17 are connected in star through leads 21 and to the impedances 18 through leads 22. The star or neutral point of the relay windings is connected with the neutral point of the secondary windings of the potential transformer 19 through the conductor 23. The windings 17 control armatures 24 which are connected to a three-armed lever 25 mounted at its center on a pivot 26 and suspended at the ends by suitable means such as springs 27. If the three forces exerted by the windings 17 are equal, then the lever 25 remains in equilibrium. Otherwise, it moves over in the direction of the greater attractive force and thereby closes its contacts 28. This effects the operation of the auxiliary devices necessary for the control and protection of the generator, for example completes the circuit of the trip coil 14 to cause the opening of the circuit breaker 13.

The operation of the embodiment of my invention shown in Fig. 1 is substantially as follows: Under normal balanced phase conditions the terminal voltages for the different phases are equal and the load currents of the generator 10 for the different phases are also equal. Consequently, the three voltages applied to the windings 17 of the relay 16 are alike and the lever 25 remains in equilibrium. This is also true in case of a three-phase or symmetrical short-circuit outside of the generator. If an unsymmetrical short-circuit occurs, for example a single phase or line to line short-circuit outside of the generator, then the voltage triangle is disturbed and the three phase voltages are of different values. Since, however, as explained above, in consequence of the connection in series with the impedances 18 supplied by the current transforming means 20, voltages are supplied to the relay windings 17 which are proportional to the electromotive forces of the individual generator phases. These electromotive forces remain of equal value even in case of unsymmetrical short-circuit outside the machine so that the lever 25 of the relay 16 maintains its position of equilibrium and the relay does not operate. If, however, the fault between the turns occurs in the generator then the electromotive force is changed and, therefore, the voltage of the phases concerned without the corresponding load current appearing in the current transformer 20. Consequently the voltages on the individual relay coils 18 are unequal and the relay operates.

If a relatively high degree of sensitiveness of the protective arrangement is desired then the reproduction of the internal voltage drop of the generator by means of constant impedances is not sufficient since as is well known, the internal voltage drop on one phase of an alternating current generator depends on the current of the phase concerned only in case of symmetrical load. In case of unsymmetrical loads, on the other hand, especially in case of single phase or line to line short-circuits the voltage drop of each individual phase depends on the currents of all phases. In this case also, however, the voltage drops can be exactly reproduced by using a small rotary machine 29 as shown in Fig. 4 instead of the impedances 18 shown in Fig. 1. This rotary machine 29 is in effect a duplicate of the generator 10 to the extent that the voltage drops in its windings 30 in case of load with currents of any value and phase are proportional to the voltage drops of the machine 10 to be protected. In order to effect this in the case of the auxiliary rotary machine, its synchronous reactance, transient reactance and phase sequence characteristics must be in approximately the same relation as those of the machine to be protected. If this condition cannot be satisfied except with difficulty as regards the construction of the auxiliary machine 29, then additional impedances may be connected in series with its windings 30.

In the embodiment of my invention shown in Fig. 5 the impedances 18 instead of being connected directly in the circuit of the relay windings are connected through intermediate transformers 31 to introduce the desired voltage drops into the relay circuit.

While I have shown and described my invention in considerable detail, I do not desire to be limited to the exact arrangements shown but seek to cover in the appended claims all those modifications as fall within the true spirit and scope of my invention.

What I claim as new and desire to secure by Letters Patent of the United States is:

1. In combination with an armature winding of a dynamo electric machine, means for controlling the circuit of said winding, means for controlling said circuit controlling means on the occurrence of an abnormal condition of said winding including a relay having a winding connected to be energized in accordance with the vector sum of the terminal voltage of said machine winding and the internal voltage drop thereof.

2. In combination, a dynamo electric machine, circuit controlling means therefor and means for controlling said circuit controlling means on the occurrence of abnormal conditions in said machine including a relay having a winding connected to be energized in accordance with the relation between the nominal and terminal voltages of the machine.

3. In combination with an electric device having a winding and control means operative on the occurrence of abnormal conditions of said winding including a relay connected to be energized in accordance with a resultant of the voltage across said winding and the internal voltage drop thereof.

4. In combination with the armature windings of a polyphase dynamo electric machine, interrupting means for controlling the circuit of said windings, means for controlling said interrupting means on the occurrence of abnormal conditions of the armature windings including a relay having a plurality of cooperating windings respectively connected to be energized in accordance with the relation between the nominal and terminal voltages of the armature windings in the different phases.

5. In combination with the armature windings of a polyphase dynamo electric machine, interrupting means for controlling the circuit of said windings, means for controlling said interrupting means on the occurrence of internal faults on the armature windings including a relay having a plurality of cooperating windings and cooperating current and potential means connected to be energized from the circuit for energizing the relay windings respectively in accordance with the vector sum of the terminal voltage and the internal voltage drop of the windings in the different phases.

6. In combination with an electric device having a winding, and interrupting means for controlling the circuit of said winding, means for controlling said interrupting means on the occurrence of abnormal conditions of said winding including a relay and current and potential means connected to be energized from the circuit of said winding to impress on said relay a voltage which is a resultant of the voltage across said winding and the internal voltage drop thereof said current means being proportioned to have an impedance characteristic substantially similar to the impedance characteristic of said winding.

7. In combination with the armature windings of a three-phase dynamo electric machine and circuit interrupting means for controlling the circuit of said windings, means for effecting the opening of said interrupting means only on the occurrence of internal faults on the armature windings including a normally balanced relay having three cooperating windings respectively connected to be energized in accordance with the vector sum of the terminal voltage and the internal voltage drop of the armature windings in the respective phases.

In witness whereof, I have hereunto set my hand this 10th day of September, 1929.

HANS PILOTY.